US010914178B2

United States Patent
LoRicco et al.

(10) Patent No.: US 10,914,178 B2
(45) Date of Patent: Feb. 9, 2021

(54) AIRFOILS HAVING TAPERED TIP FLAG CAVITY AND CORES FOR FORMING THE SAME

(71) Applicant: United Technologies Corporation, Farmington, CT (US)

(72) Inventors: Nicholas M. LoRicco, Windsor, CT (US); Jeffrey T. Morton, Manchester, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 85 days.

(21) Appl. No.: 16/299,915

(22) Filed: Mar. 12, 2019

(65) Prior Publication Data

US 2020/0291789 A1    Sep. 17, 2020

(51) Int. Cl.
    *F01D 5/18*  (2006.01)
    *F01D 5/14*  (2006.01)
(52) U.S. Cl.
    CPC .......... *F01D 5/187* (2013.01); *F01D 5/147* (2013.01); *F05D 2240/122* (2013.01); *F05D 2240/125* (2013.01); *F05D 2240/304* (2013.01); *F05D 2240/307* (2013.01); *F05D 2260/221* (2013.01)
(58) Field of Classification Search
    CPC ............. F01D 5/187; F05D 2240/122; F05D 2240/125
    See application file for complete search history.

(56) References Cited

U.S. PATENT DOCUMENTS

| 4,767,268 | A | * | 8/1988 | Auxier | F01D 5/187 |
| | | | | | 415/115 |
| 7,104,757 | B2 | | 9/2006 | Gross | |
| 7,300,250 | B2 | | 11/2007 | Papple | |
| 7,607,891 | B2 | | 10/2009 | Cherolis et al. | |
| 9,546,554 | B2 | * | 1/2017 | Crites | F01D 5/187 |
| 9,938,836 | B2 | | 4/2018 | Weber et al. | |
| 10,294,799 | B2 | * | 5/2019 | Spangler | F01D 9/041 |

(Continued)

FOREIGN PATENT DOCUMENTS

EP    3196414 A1    7/2017

OTHER PUBLICATIONS

European Search Report for European Application No. 20159765.5, International Filing Date Feb. 27, 2020, dated Jun. 30, 2020, 11 pages.

*Primary Examiner* — Brian P Wolcott
(74) *Attorney, Agent, or Firm* — Cantor Colburn LLP

(57) ABSTRACT

Core assemblies for manufacturing airfoils and airfoils for gas turbine engines are described. The core assemblies include a tip flag cavity core having an upstream portion, a tapering portion, and a downstream portion, with the tapering portion located between the upstream portion and the downstream portion and the downstream portion defines an exit in a formed airfoil. The upstream portion has a first radial height $H_1$, the downstream portion has a second radial height $H_2$ that is less than the first radial height $H_1$, the tapering portion transitions from the first radial height $H_1$ at an upstream end to the second radial height $H_2$ at a downstream end, and at least one metering pedestal aperture is located within the tapering portion.

18 Claims, 7 Drawing Sheets

(56) References Cited

U.S. PATENT DOCUMENTS

| | | | |
|---|---|---|---|
| 10,443,398 B2 * | 10/2019 | Krumanaker | F01D 5/147 |
| 10,502,067 B2 * | 12/2019 | Mongillo | F04D 29/582 |
| 2016/0245097 A1 | 8/2016 | Jones et al. | |
| 2018/0283183 A1 * | 10/2018 | Gallier | F01D 25/12 |

* cited by examiner

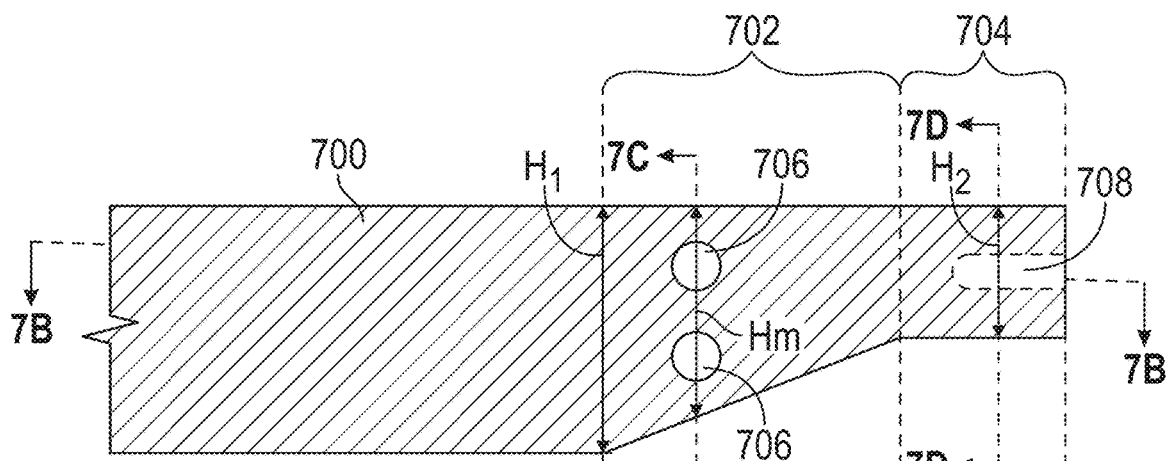
FIG. 7A
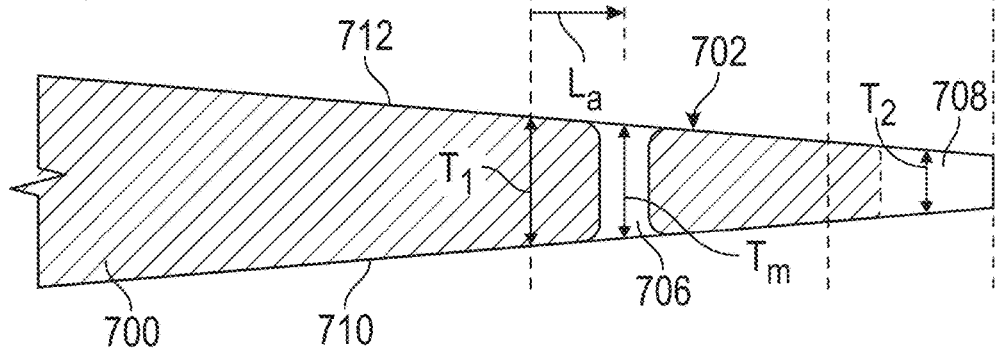
FIG. 7B
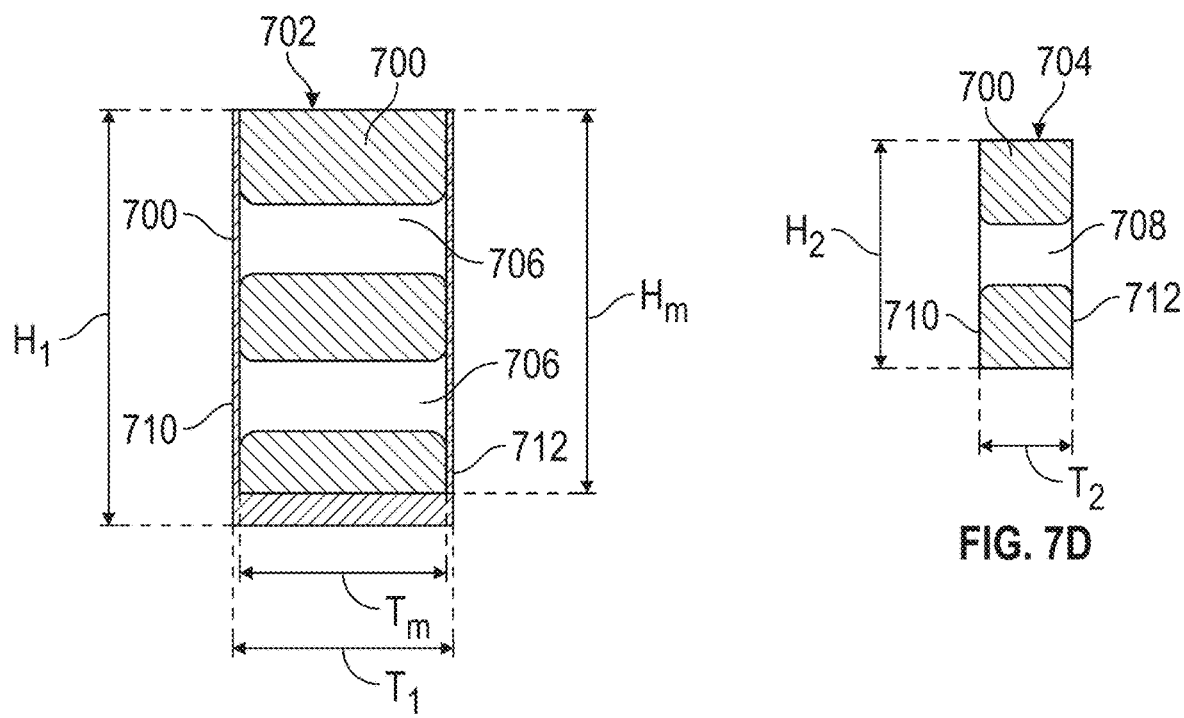
FIG. 7C
FIG. 7D

US 10,914,178 B2

AIRFOILS HAVING TAPERED TIP FLAG CAVITY AND CORES FOR FORMING THE SAME

BACKGROUND

Illustrative embodiments pertain to the art of turbomachinery, and specifically to turbine rotor components.

Gas turbine engines are rotary-type combustion turbine engines built around a power core made up of a compressor, combustor and turbine, arranged in flow series with an upstream inlet and downstream exhaust. The compressor compresses air from the inlet, which is mixed with fuel in the combustor and ignited to generate hot combustion gas. The turbine extracts energy from the expanding combustion gas, and drives the compressor via a common shaft. Energy is delivered in the form of rotational energy in the shaft, reactive thrust from the exhaust, or both.

The individual compressor and turbine sections in each spool are subdivided into a number of stages, which are formed of alternating rows of rotor blade and stator vane airfoils. The airfoils are shaped to turn, accelerate and compress the working fluid flow, or to generate lift for conversion to rotational energy in the turbine.

BRIEF DESCRIPTION

According to some embodiments, core assemblies for manufacturing airfoils for gas turbine engines are provided. The core assemblies include a tip flag cavity core having an upstream portion, a tapering portion, and a downstream portion, with the tapering portion located between the upstream portion and the downstream portion and the downstream portion defines an exit in a formed airfoil. The upstream portion has a first radial height $H_1$, the downstream portion has a second radial height $H_2$ that is less than the first radial height $H_1$, the tapering portion transitions from the first radial height $H_1$ at an upstream end to the second radial height $H_2$ at a downstream end, and at least one metering pedestal aperture is located within the tapering portion.

In addition to one or more of the features described above, or as an alternative, further embodiments of the core assemblies may include a leading edge cavity core arranged in connection with the tip flag cavity core, wherein the leading edge cavity core is configured to form a leading edge cavity that is fluidly connected to a tip flag cavity formed by the tip flag cavity core.

In addition to one or more of the features described above, or as an alternative, further embodiments of the core assemblies may include one or more cavity cores configured to form a serpentine cavity in the formed airfoil.

In addition to one or more of the features described above, or as an alternative, further embodiments of the core assemblies may include a trailing edge cavity core configured to form a trailing edge cavity in the formed airfoil.

In addition to one or more of the features described above, or as an alternative, further embodiments of the core assemblies may include that the tapering portion has a first circumferential thickness $T_1$ and the downstream portion has a second circumferential thickness $T_2$, wherein the first circumferential thickness $T_1$ is greater than the second circumferential thickness $T_2$.

In addition to one or more of the features described above, or as an alternative, further embodiments of the core assemblies may include that the first circumferential thickness $T_1$ has a relationship to the second circumferential thickness $T_2$ of between 1.25:1 to 4:1.

In addition to one or more of the features described above, or as an alternative, further embodiments of the core assemblies may include that the at least one metering pedestal aperture is positioned at an axial location $L_a$ within the tapering portion, with the axial location $L_a$ based on a point of transition from the upstream portion to the tapering portion.

In addition to one or more of the features described above, or as an alternative, further embodiments of the core assemblies may include that the at least one metering pedestal aperture is two metering pedestal apertures.

In addition to one or more of the features described above, or as an alternative, further embodiments of the core assemblies may include at least one structure to form a cooling feature fluidically connected to a formed gas path located within the downstream portion.

In addition to one or more of the features described above, or as an alternative, further embodiments of the core assemblies may include that the first radial height $H_1$ has a relationship to the second radial height $H_2$ of between 1.25:1 to 4:1.

According to some embodiments, airfoils for gas turbine engines are provided. The airfoils include a tip flag cavity arranged proximate a tip of an airfoil body, the tip flag cavity having an upstream portion, a tapering portion, and a downstream portion, with the tapering portion located between the upstream portion and the downstream portion and the downstream portion defines an exit in the airfoil body. The upstream portion has a first radial height $H_1$, the downstream portion has a second radial height $H_2$ that is less than the first radial height $H_1$, the tapering portion transitions from the first radial height $H_1$ at an upstream end to the second radial height $H_2$ at a downstream end, and at least one metering pedestal is located within the tapering portion.

In addition to one or more of the features described above, or as an alternative, further embodiments of the airfoils may include a leading edge cavity arranged in fluid connection with the tip flag cavity.

In addition to one or more of the features described above, or as an alternative, further embodiments of the airfoils may include a serpentine cavity.

In addition to one or more of the features described above, or as an alternative, further embodiments of the airfoils may include a trailing edge cavity.

In addition to one or more of the features described above, or as an alternative, further embodiments of the airfoils may include that the tapering portion has a first circumferential thickness $T_1$ and the downstream portion has a second circumferential thickness $T_2$, wherein the first circumferential thickness $T_1$ is greater than the second circumferential thickness $T_2$.

In addition to one or more of the features described above, or as an alternative, further embodiments of the airfoils may include that the first circumferential thickness $T_1$ has a relationship to the second circumferential thickness $T_2$ of between 1.25:1 to 4:1.

In addition to one or more of the features described above, or as an alternative, further embodiments of the airfoils may include that the at least one metering pedestal is positioned at an axial location $L_a$ within the tapering portion, with the axial location $L_a$ based on a point of transition from the upstream portion to the tapering portion.

In addition to one or more of the features described above, or as an alternative, further embodiments of the airfoils may include that the at least one metering pedestal is two metering pedestals.

In addition to one or more of the features described above, or as an alternative, further embodiments of the airfoils may include at least one cooling feature fluidically connected to the gas path located within the downstream portion.

In addition to one or more of the features described above, or as an alternative, further embodiments of the airfoils may include that the first radial height $H_1$ has a relationship to the second radial height $H_2$ of between 1.25:1 to 4:1.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike: The subject matter is particularly pointed out and distinctly claimed at the conclusion of the specification. The foregoing and other features, and advantages of the present disclosure are apparent from the following detailed description taken in conjunction with the accompanying drawings in which like elements may be numbered alike and:

FIG. 7A is a schematic illustration of a tip flag cavity core in accordance with an embodiment of the present disclosure;

FIG. 7B is a cross-sectional illustration of the tip flag cavity core of FIG. 7A as viewed along the line B-B;

FIG. 7C is a cross-sectional illustration of the tip flag cavity core of FIG. 7A as viewed along the line C-C;

FIG. 7D is a cross-sectional illustration of the tip flag cavity core of FIG. 7A as viewed along the line D-D.

DETAILED DESCRIPTION

Detailed descriptions of one or more embodiments of the disclosed apparatus and/or methods are presented herein by way of exemplification and not limitation with reference to the Figures.

Figure 1:
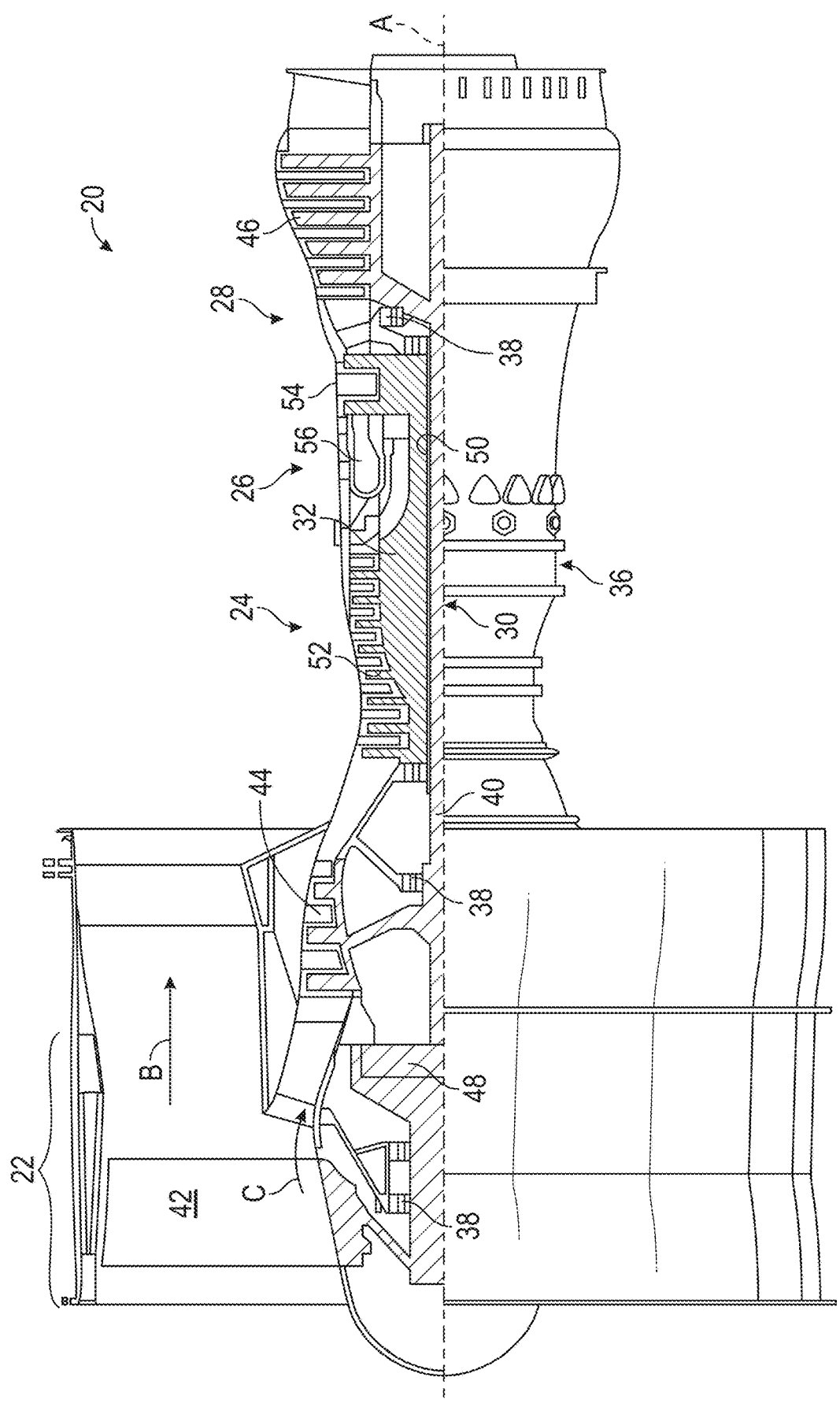
FIG. 1 is a schematic cross-sectional illustration of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ ^\circ R)/(518.7^\circ R)]^{0.5}$. The "Low corrected fan tip speed" as disclosed herein according to one non-limiting embodiment is less than about 1150 ft/second (350.5 m/sec).

Although the gas turbine engine 20 is depicted as a turbofan, it should be understood that the concepts described herein are not limited to use with the described configuration, as the teachings may be applied to other types of engines such as, but not limited to, turbojets, turboshafts, and three-spool (plus fan) turbofans wherein an intermediate spool includes an intermediate pressure compressor ("IPC") between a low pressure compressor ("LPC") and a high pressure compressor ("HPC"), and an intermediate pressure turbine ("IPT") between the high pressure turbine ("HPT") and the low pressure turbine ("LPT").

Figure 2:
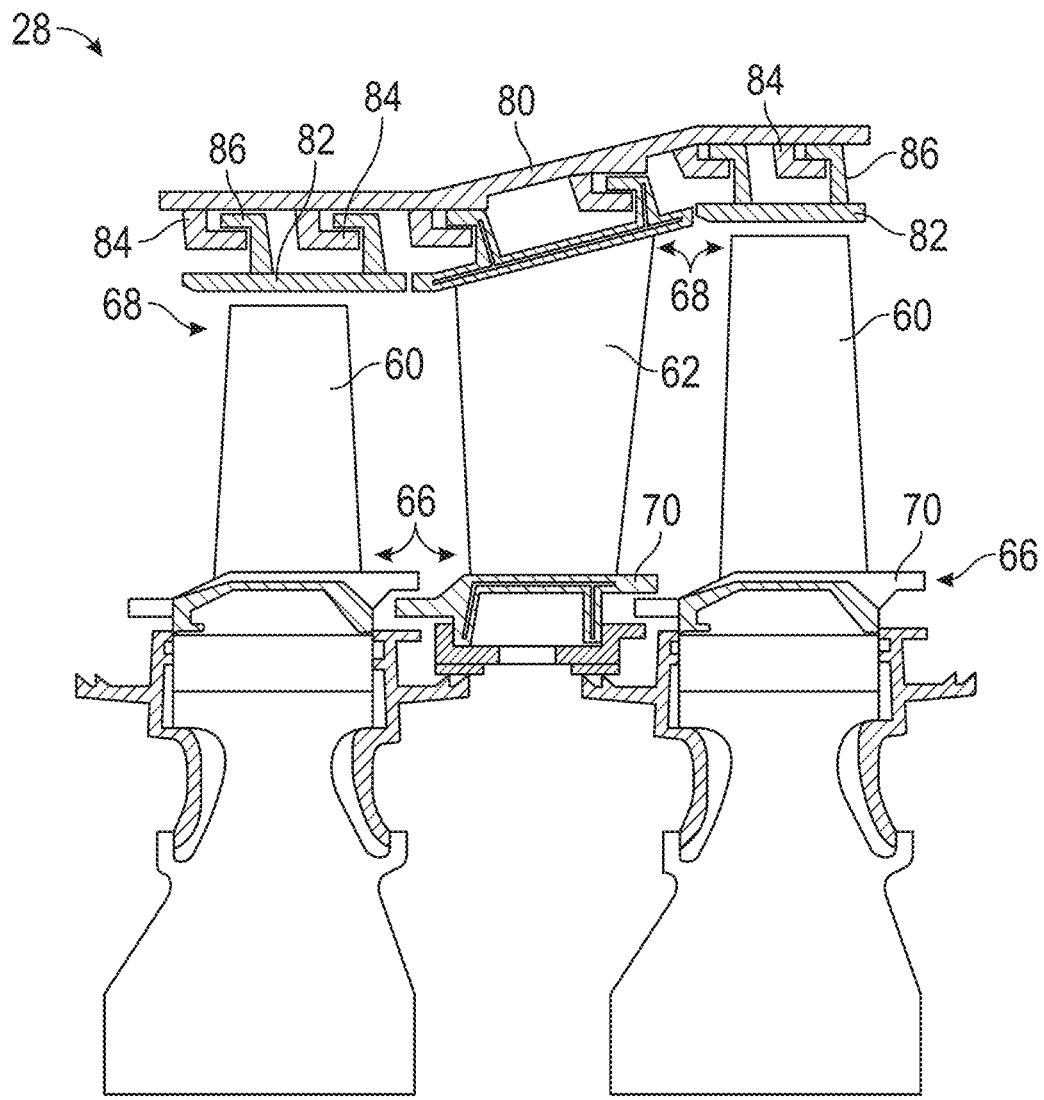
FIG. 2 is a schematic illustration of a portion of a turbine section of the gas turbine engine of FIG. 1.

FIG. 2 is a schematic view of a portion of the turbine section 28 that may employ various embodiments disclosed herein. Turbine section 28 includes a plurality of airfoils 60, 62 including, for example, one or more blades and vanes. The airfoils 60, 62 may be hollow bodies with internal cavities defining a number of channels or cores, hereinafter airfoil cores, formed therein and extending from an inner diameter 66 to an outer diameter 68, or vice-versa. The airfoil cores may be separated by partitions within the airfoils 60, 62 that may extend either from the inner diameter 66 or the outer diameter 68 of the airfoil 60, 62. The partitions may extend for a portion of the length of the airfoil 60, 62, but may stop or end prior to forming a complete wall within the airfoil 60, 62. Thus, each of the airfoil cores may be fluidly connected and form a fluid path within the respective airfoil 60, 62. The airfoils 60, 62 may include platforms 70 located proximal to the inner diameter 66 thereof. Located below the platforms 70 (e.g., radially inward with respect to the engine axis) may be airflow ports and/or bleed orifices that enable air to bleed from the internal cavities of the airfoils 60, 62. A root of the airfoil may connect to or be part of the platform 70.

The turbine section 28 is housed within a case 80, which may have multiple parts (e.g., turbine case, diffuser case, etc.). In various locations, components, such as seals, may be positioned between airfoils 60, 62 and the case 80. For example, as shown in FIG. 2, blade outer air seals 82 (hereafter "BOAS") are located radially outward from the blade 60. As will be appreciated by those of skill in the art, the BOAS 82 may include BOAS supports that are configured to fixedly connect or attach the BOAS 82 to the case 80 (e.g., the BOAS supports may be located between the BOAS 82 and the case 80). As shown in FIG. 2, the case 80 includes a plurality of case hooks 84 that engage with BOAS hooks 86 to secure the BOAS 82 between the case 80 and a tip of the airfoil 60.

Figure 3:
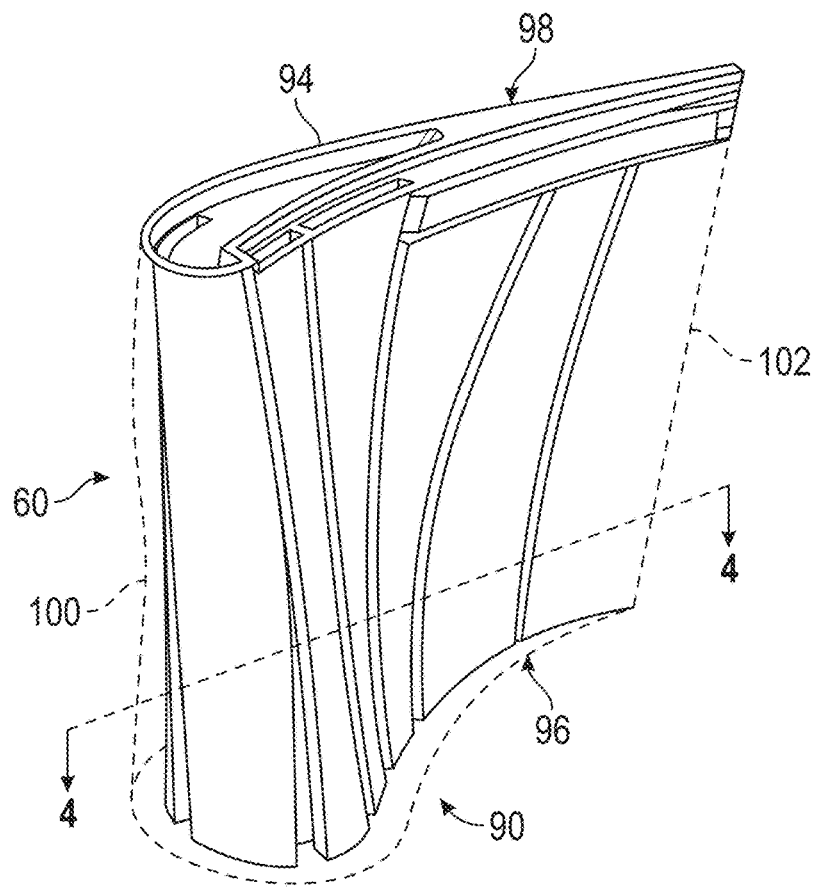
FIG. 3 is a perspective view of an airfoil that can incorporate embodiments of the present disclosure.
Figure 4:
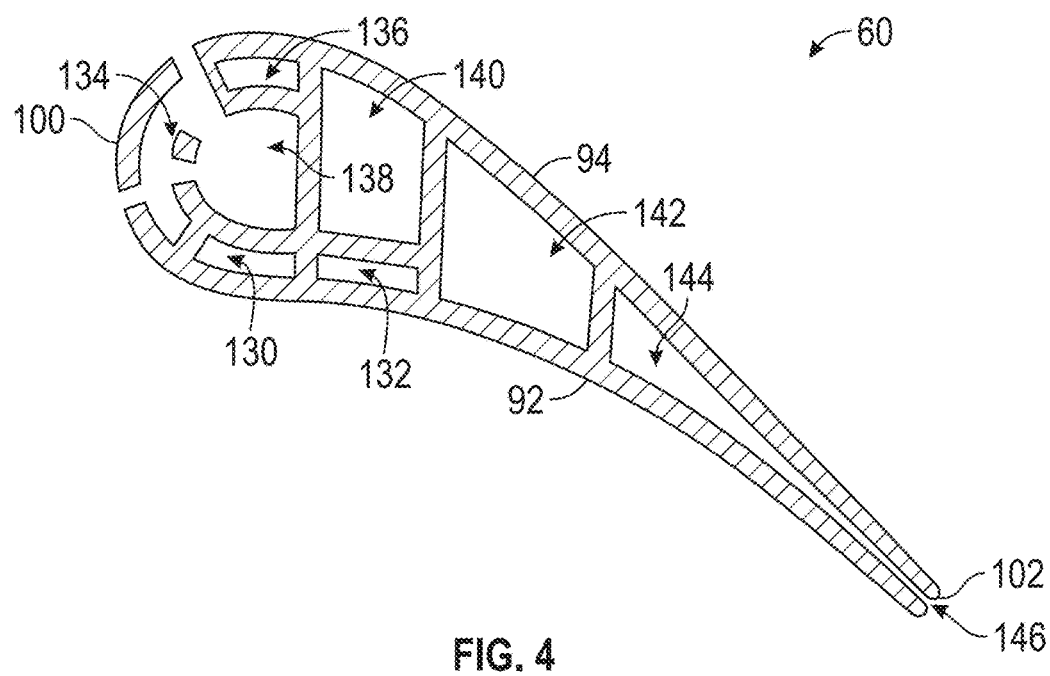
FIG. 4 is a partial cross-sectional view of the airfoil of FIG. 3 as viewed along the line 4-4 shown in FIG. 3.

As shown in FIGS. 3-4, the airfoil 60 includes an airfoil body 90 having a pressure side 92, a suction side 94, a root region 96, a tip region 98, a leading edge 100, and a trailing edge 102. The pressure side 92 is disposed opposite the suction side 94. The pressure side 92 and the suction side 94 each extend radially from the root region 96 to the tip region 98. As used herein, the term "radial" refers to radial with respect to an engine axis (e.g., engine central longitudinal axis A shown in FIG. 1). The pressure side 92 and the suction side 94 each extend generally axially and/or tangentially (e.g., with respect to the engine axis) between the leading edge 100 and the trailing edge 102. Each of the root region 96 and the tip region 98 extend from the leading edge 100 to the trailing edge 102 opposite each other at ends of the airfoil body 90 in the radial direction. That is, the root region 96 defines an inner radial end of the airfoil body 90 and the tip region defines an outer radial end of the airfoil body 90 (relative to an engine axis). The airfoil 60 may be a blade or vane, and have various other features associated with such configurations, e.g., platforms, tip surfaces, etc.

As shown in FIG. 4, illustrating a cross-sectional view of the airfoil 60 as viewed along the line 4-4 shown in FIG. 3, the airfoil body 90 defines or includes a plurality of internal cavities to enable cooling of the airfoil 60. For example, as shown, the airfoil 60 includes a plurality of forward and side cooling skin core cooling cavities 130, 132, 134, 136, 138 immediately proximate the external hot wall surfaces. In the relative middle of the airfoil body 90, the airfoil 60 includes various serpentine flow cavities 140, 142, 144 and, at the trailing edge 102, a trailing edge slot 146. The most aftward (aft-flowing) serpentine flow cavity 144 defines a serpentine trailing edge core that fluidly connects to the trailing edge slot 146 that is formed at the trailing edge 102. In the present illustration, a first serpentine cavity 140 may be arranged for flow in a first direction (e.g., an up pass cooling flow), a second serpentine cavity 142 may be arranged for flow in a second direction (e.g., a down pass cooling flow), and a third serpentine cavity 144 may be arranged for flow in the first direction and/or a third direction (e.g., an up pass cooling flow that exits the airfoil 60 through the trailing edge slot 146). Although shown with a specific internal cooling cavity arrangement, airfoils in accordance with the present disclosure may include additional and/or alternative cavities, flow paths, channels, etc. as will be appreciated by those of skill in the art, including, but not limited to, tip cavities, serpentine cavities, trailing edge cavities, etc.

Figure 5:
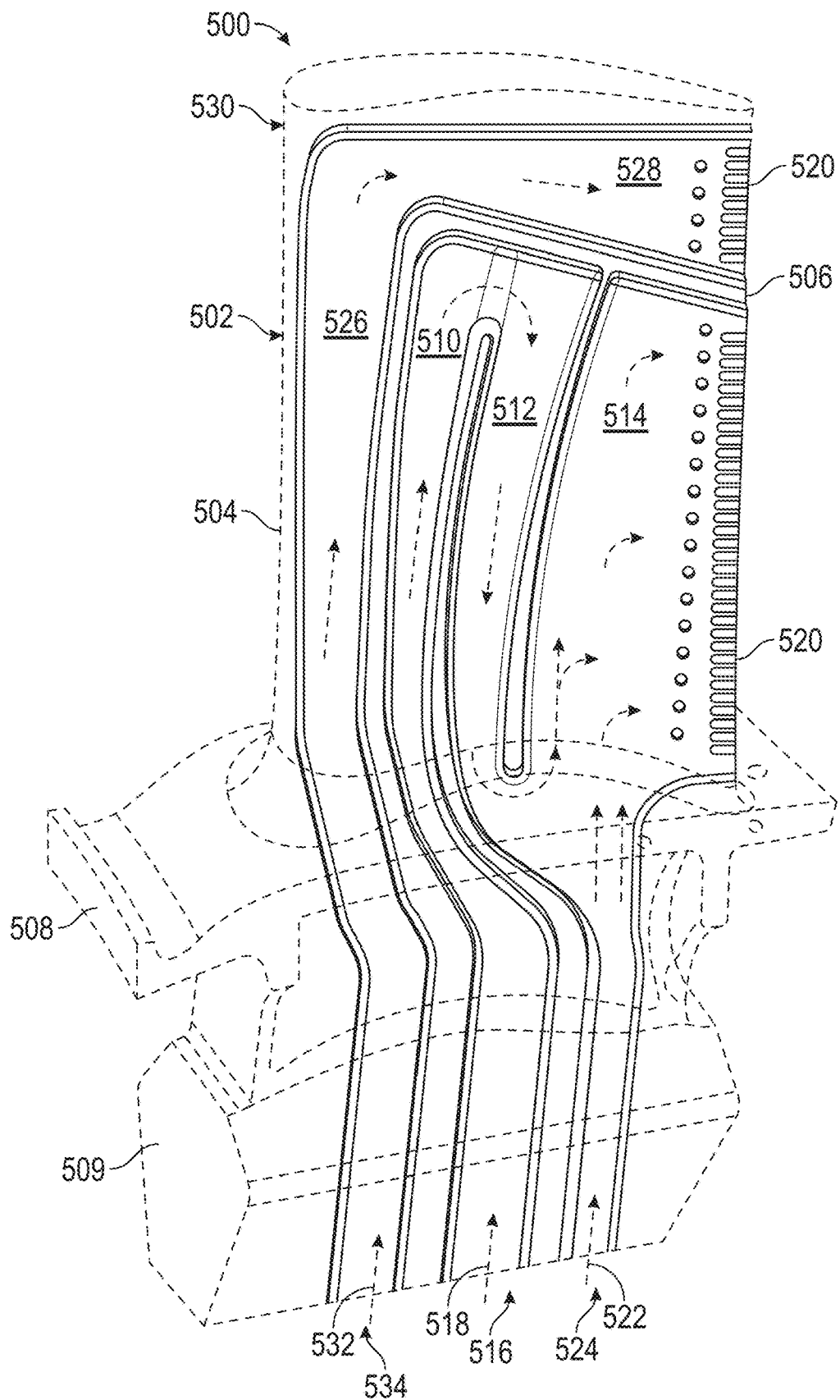
FIG. 5 is a schematic illustration of an airfoil in accordance with an embodiment of the present disclosure.

Turning now to FIG. 5, a schematic illustration of an airfoil 500 having an airfoil body 502 with a leading edge 504 and a trailing edge 506 is shown. In the present illustrative example, the airfoil 500 is shown as a blade with the airfoil body 502 extending from a platform 508. The platform 508 is arranged to connect to or otherwise attach to a rotor disc for operation within a gas turbine engine by means of attachment 509 (which may be integral or separate from the airfoil body 502). In some non-limiting arrangements, the platform 508 and attachment 509 may be integrally formed with the rotor disc, or in some embodiments the attachment 509 may be integral with a rotor disc and the platform 508 may be attached to the attachment 509.

The airfoil body 502 and the platform 508 include internal cooling passages and cavities that are arranged to enable cooling air to flow through the internal portions of the airfoil 500 to provide cooling during operation. Illustratively shown in FIG. 5 is a serpentine cavity including cavities 510, 512, 514, which each define a portion of a serpentine cooling flow path. A first serpentine cavity 510 is an up pass cavity, as illustratively shown, with a serpentine inlet 516 suppling serpentine cooling air 518 through the platform 508 and into the airfoil body 502. The serpentine cooling air 518 flows upward (e.g., radially outward when installed within a gas turbine engine) through the first serpentine cavity 510. The serpentine cooling air 518 then turns and flows downward (radially inward) through a second serpentine cavity 512. The serpentine cooling air 518 then will turn again and flow upward (radially outward) into and through a third serpentine cavity 514. The serpentine cooling air 518 will then exit the airfoil 500 through one or more trailing edge slots 520 at the trailing edge 506. As shown, this illustration shows an aftward flow (aft-flowing) of cooling air 518 through the serpentine cavities 510, 512, 514, i.e., flowing generally from the leading edge 504 toward (and out) the trailing edge 506.

As the serpentine cooling air 518 flows through the serpentine cavities 510, 512, 514 the air will absorb heat from the material of the airfoil body 502. Accordingly, the thermal cooling efficiency of the serpentine cooling air 518 will decrease as the air moves through the serpentine cavities 510, 512, 514 as a result of the increase in heat pickup of the cooling air temperature as it migrates through the circuitous serpentine cooling passages. To improve the thermal cooling effectiveness toward the trailing edge 506 of the airfoil 500, e.g., within the third serpentine cavity 514, resupply air 522 can be introduced into the airfoil 500 through a resupply inlet 524 that is formed within the attachment 509. The resupply air 522 will interact with the serpentine cooling air 518 at a junction within the airfoil 500, as shown in FIG. 5.

Also shown in FIG. 5 is a leading edge cavity 526 and a tip flag cavity 528 are provided along the leading edge 504 and a tip region 530. Tip flag cooling air 532 is supplied through a leading edge inlet 534. The tip flag cooling air 532 provide cooling toward the leading edge 504 of the airfoil 500. In some embodiments, the leading edge cavity 526 may be substantially adjacent the leading edge 504 of the airfoil body 502 as well as the hot surfaces of the pressure and suction sides of the airfoil body 502. In other embodiments, the leading edge cavity 526 can be contained within "cold" walls, such as that shown in FIG. 4 (see, e.g., cavity 138). Various other arrangements are possible, as will be appreciated by those of skill in the art. The tip flag cooling air 532 flows radially outward through the airfoil body 502 from the platform 508 toward the tip region 530 and then turns aftward to flow predominantly in an axial direction through the tip flag cavity 528 and then exits through one or more trailing edge slots 520 at the trailing edge 506.

In the effort to improve gas turbine efficiency, it is desirable to reduce turbine cooling air requirements. Small internal features are ideal for heat transfer. However, such small internal features may lead to manufacturing concerns due to the strength of ceramic cores used in investment casting processes for making the airfoils (or other components).

Embodiments of the present disclosure are directed to the incorporation of metering pedestals in the tip flag circuit upstream of the exit, where the core is very small and narrow due to aerodynamic requirements. The exit is left relatively thick relative to the trailing edge exits in the main trailing edge cavity which does not have the same core fragility. By positioning metering pedestals upstream of the exit within the tip flag cavity, core integrity can be improved at the location most likely to break during the manufacturing process, thus, for example, increasing casting yields.

As used herein, the term "meter" of a cooling circuit refers to the location of minimum hydraulic area for which the cooling flow passes through. Typically, while non-metering cooling features can induce a pressure drop, the losses are secondary to those incurred at the "meter" of the circuit. That is, a meter region of a flow path or cavity may be different from a location having pedestals or other thermal transfer augmentation features. This is particularly true when the hydraulic area of the metering location is much smaller than the hydraulic area upstream and/or downstream of such location.

In accordance with embodiments of the present disclosure, a tapering or narrowing tip flag cavity core is provided to form a respective tapering or narrowing tip flag cavity in a formed airfoil. The tapering tip flag cavity core may have an upstream portion with a first radial height, a tapering portion that has a narrowing radial height, and a downstream portion having a second radial height, with the tapering portion changing in height from the first radial height at an upstream end to the second radial height at a downstream end. The tip flag cavity (cavity core) thus includes a tapering or narrowing of the radial dimension (with respect to a formed airfoil). Within the tapering portion, one or more metering pedestals may be arranged to further define the meter region of the circuit (tip flag cavity). In some embodiments, an exit of the formed tip flag cavity will be out a trailing edge of the airfoil, with the exit having, in some embodiments, the second radial height. In other embodiments, the exit may be located on the pressure side, suction side, at the trailing edge, or combinations thereof. Further, it is noted that in addition to a radial tapering, a circumferential tapering or narrowing may also be present as a cavity is directed toward a trailing edge. That is, the airfoil may narrow in the dimension between the pressure and suction sides in a direction extending toward the trailing edge, as will be appreciated by those of skill in the art.

As the core tapers to the trailing edge exit, the core strength is inherently reduced. Producibility suffers due to this reduced strength in the cores. This is particularly true when metering features, such as trailing edge slot 'spears' (e.g., trailing edge slots 520) are added to the narrow sections of the tip flag. In contrast, in accordance with embodiments of the present disclosure, by using metering pedestals to meter the flow at a locally thicker (e.g., radially/circumferentially) location in the tip flag core, structural integrity of the core can be improved. The improved core strength is achieved due to having a larger metering area and/or having a shape less susceptible to bending failure modes (e.g., higher moment of inertia along an axis). In some embodiments, the metering pedestals of the present disclosure may be located upstream in a relatively thicker (e.g., radially/circumferentially) region in a location where the core strength is maximized without compromising on a desired metering area for a given cavity.

Figure 6:
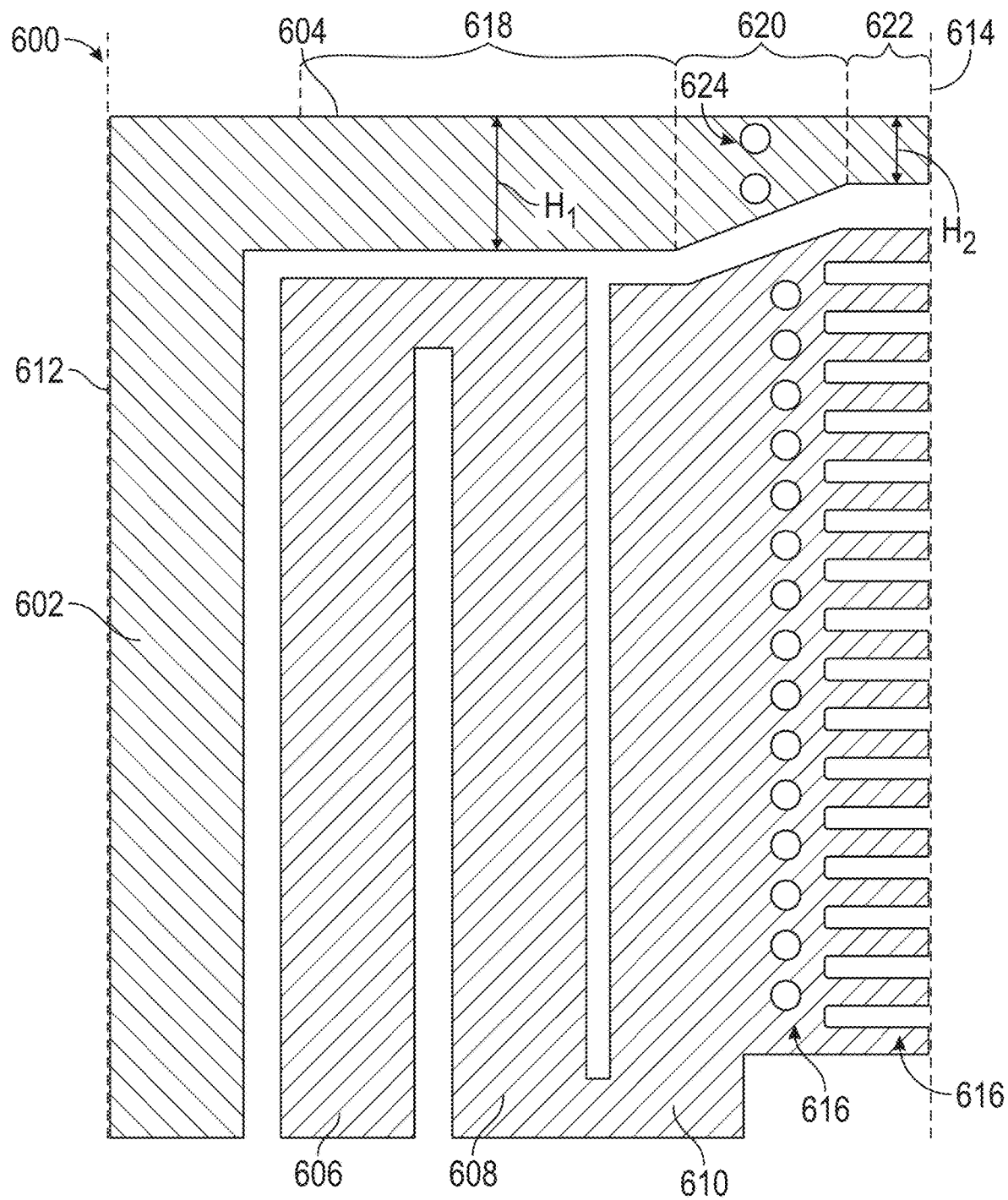
FIG. 6 is a schematic illustration of a core assembly in accordance with an embodiment of the present disclosure.

Turning now to FIG. 6, a schematic illustration of a core assembly 600 for making an airfoil in accordance with an embodiment of the present disclosure is shown. The core assembly 600 can be used to form an airfoil similar to that shown in FIGS. 2-5, or variations thereof, with the features as described herein, and potentially including other additional features, without departing from the scope of the present disclosure.

The core assembly 600 includes a leading edge cavity core 602, a tip flag cavity core 604, serpentine cavity cores 606, 608, and a trailing edge cavity core 610. As shown, the leading edge cavity core 602 and the tip flag cavity core 604 are formed as a single core structure and are configured to form a leading edge cavity that fluidly connects or flows into a tip flag cavity in a formed airfoil. When assembled, the leading edge cavity core 602 is arranged along a leading edge 612 of a formed airfoil, and the tip flag cavity core 604 extends to a trailing edge 614 of the formed airfoil. As such, in a formed airfoil, cooling air can enter the formed leading edge cavity, flow radially through the formed leading edge cavity, flow into the formed tip flag cavity, and exit the airfoil at the trailing edge 614 through a formed exit. Additionally, as will be appreciated by those of skill in the art, one or more leading edge impingement cavity cores may be disposed between the leading edge cavity core 602 and the leading edge 612, to form respective leading edge impingement cavities in a formed airfoil.

The serpentine cavity cores 606, 608 and the trailing edge cavity core 610 are arranged relative to the leading edge cavity core 602 and the tip flag cavity core 604. As shown, the trailing edge cavity core 610 includes one or more heat transfer augmentation features and/or metering elements 616 (e.g., pedestals to form slots).

The tip flag cavity core 604 is arranged to form a metered section of the formed tip flag cavity at a location upstream of the exit at the trailing edge 614 of the formed airfoil. To accomplish this, the tip flag cavity core 604 includes an upstream portion 618 with a first radial height $H_1$, a tapering portion 620 that has a narrowing radial height, and a downstream portion 622 having a second radial height $H_2$, with the tapering portion 620 changing in height from the first radial height $H_1$ at an upstream end to the second radial height $H_2$ at a downstream end of the tapering portion 620. The tip flag cavity core 604 also tapers in a circumferential direction, i.e., pressure side to suction side thickness, or normal to an airfoil camber line, as shown and described with respect to FIGS. 7A-7D below. That is, the tip flag cavity core 604 may have a greater first circumferential thickness $T_1$ at the location of the first radial height $H_1$ than at a downstream location with a second circumferential thickness $T_2$ at the second radial height $H_2$. It will be appreciated that the first radial height $H_1$ and the first circumferential thickness $T_1$ define a first area $A_1=H_1*T_1$ that is located upstream of the tapering portion 620. Further the second radial height $H_2$ and the second circumferential thickness $T_2$ define a second area $A_2=H_2*T_2$ that is located downstream of the tapering portion 620. Accordingly, the magnitude of thinning or narrowing along the tapering portion 620 (e.g., in the height and/or thickness direction) can vary such that the area relationships creates a minimum hydraulic diameter at a desired meter location. As noted above, the tip flag cavity core 604 includes both radial tapering and circumferential tapering or narrowing as a cavity is directed or extends toward the trailing edge 614. That is, the core assembly 600 narrows in the dimension between the pressure and suction sides in a direction extending toward the trailing edge, as will be appreciated by those of skill in the art. The tapering in the circumferential direction may occur in both the upstream portion 618 and the downstream portion 622, in addition to the tapering portion 620.

Positioned or located within the tapering portion 620 are one or more metering pedestal apertures 624. The metering pedestal apertures 624 are arranged to enable the formation of respective metering pedestals within the formed tip flag cavity at the location of the tapering portion 620. The position of the metering pedestal apertures 624 is such that they are located in a portion of the tip flag core 604 with a radial height $H_m$ and a circumferential thickness $T_m$ (i.e., pressure side to suction side thickness, or normal to an airfoil camber line), such that $H_1 \geq H_m \geq H_2$ and $T_1 \geq T_m \geq T_2$. As such, the metering pedestal apertures 624 are located in a thicker material of the tip flag cavity core 604, which can thus ensure the structural integrity of the core assembly 600, and further increasing the producibility of the core assembly 600 and airfoils formed therefrom. The position of the metering pedestal apertures 624 is such that a location of the cooling circuit meter of the formed tip flag cavity is arranged upstream of an exit and within the tapering portion 620.

This may be beneficial as compared to the formation of slot structures (e.g., as shown in FIG. 5), particularly if a radially narrowing tip flag cavity core/tip flag cavity is employed. It is noted that FIG. 5 illustrates a tip flag cavity 528 that increases in radial height in a downstream or flowpath direction (i.e., in a direction from leading edge toward trailing edge). However, when employing a tip flag cavity core/tip flag cavity with a narrowing radial height, the trailing edge features may impact (potentially significantly) the structural integrity and/or producibility, as such features may require fine detail and/or removed material (e.g., apertures, cut outs, etc.) that reduce the strength of and/or cause stress risers at locations within the core and/or formed airfoil. By positioning the metering pedestal apertures within a tapering portion of the tip flag cavity core at a position upstream of the exit, the position of the cooling circuit meter may be configured for desired cooling characteristics while maintaining structural integrity and/or producibility of the core assemblies and/or airfoils formed therefrom.

Turning now to FIGS. 7A-7D, schematic illustrations of a tip flag cavity core 700 for a core assembly in accordance with an embodiment of the present disclosure is shown. The tip flag cavity core 700 may be similar to that shown and described with respect to FIG. 6. The tip flag cavity core 700 includes a tapering portion 702 that narrows in a radial height toward a downstream portion 704. The downstream portion 704 defines an exit for a formed tip flag cavity in a formed airfoil. The tip flag cavity core 700 includes one or more metering pedestal apertures 706 within the tapering portion 702 of the tip flag cavity core 700, as described above. Further, in the schematic illustrations of FIGS. 7A-7D, a dashed outline of a cooling feature 708 fluidically connected to the gas path is shown. The cooling feature 708, in some embodiments, may be a slot-configuration, although pedestals or other features (positive or negative features) may be employed without departing from the scope of the present disclosure. It will be appreciated that the cooling feature 708 may be a structure configured to form a cooling feature within a cooling channel or gas path through an interior of a formed airfoil. This is an optional feature in accordance with some embodiments of the present disclosure, and in other embodiments, e.g., as shown in FIG. 6, this feature may be omitted.

FIG. 7A is a side elevation view of the tip flag cavity core 700. FIG. 7B is a cross-sectional view of the tip flag cavity core 700 as viewed along the line B-B of FIG. 7A. FIG. 7C is a cross-sectional view of the tip flag cavity core 700 as viewed along the line C-C of FIG. 7A though the center of the metering pedestals 706. FIG. 7D is a cross-sectional view of the tip flag cavity core 700 as viewed along the line D-D of FIG. 7A.

The tip flag cavity core 700 includes a pressure side 710 and a suction side 712 that are configured to enable the formation of pressure and suction side walls of a formed airfoil, as will be appreciated by those of skill in the art. The tip flag cavity core 700 has a circumferential thickness that is defined as a distance or length between the pressure side 710 and the suction side 712. As known in the art, as an airfoil extends in an axial direction (from leading edge to trailing edge), the airfoil body (and the cores used to form such airfoils) thins in the circumferential direction, to form a relatively narrow trailing edge. As such, the circumferential thickness, of the airfoil and cores to make the same, will taper or narrow toward the trailing edge (e.g., downstream portion 704). Because the tapering portion 702 has a greater first circumferential thickness $T_1$ than a second circumferential thickness $T_2$ at the downstream portion 704, placement of the metering pedestal apertures 706 within the tapering portion 702 has less of a structural and/or integrity impact to the tip flag cavity core 700 than, for example, the slot configuration aperture 708 located at the downstream portion 704 (e.g., trailing edge) of the tip flag cavity core 700.

As shown, and described above, the tip flag cavity core 700 has a first radial height $H_1$ at a location upstream of the tapering portion 702 that has a narrowing radial height. The downstream portion 704 has a second radial height $H_2$, with the tapering portion 702 changing in height from the first radial height $H_1$ at an upstream end to the second radial height $H_2$ at a downstream end of the tapering portion 702. The tip flag cavity core 700 also tapers in a in a circumferential direction, i.e., pressure side to suction side thickness, or normal to an airfoil camber line. As shown, the tip flag cavity core 700 may has a first circumferential thickness $T_1$ at the location of the first radial height $H_1$ and a second circumferential thickness $T_2$ at the second radial height $H_2$. It will be appreciated that the first radial height $H_1$ and the first circumferential thickness $T_1$ define a first area $A_1=H_1*T_1$ that is located upstream of the tapering portion 702. Further, the second radial height $H_2$ and the second circumferential thickness $T_2$ define a second area $A_2=H_2*T_2$ that is located downstream of the tapering portion 702. Accordingly, the magnitude of thinning or narrowing along the tapering portion 702 (e.g., in the height and/or thickness direction) can vary such that the area relationships creates a minimum hydraulic diameter at a desired meter location. A metering radial height $H_m$ and a metering circumferential thickness $T_m$ define a metering area $A_m=(H_m*T_m)$−(Cross sectional area of metering pedestals) that is located within the tapering portion 702 (e.g., along or at the location of the line C-C shown in FIG. 7A). It is noted that the metering area $A_m$ is not merely just the product of the metering radial height $H_m$ and the metering circumferential thickness $T_m$, but rather, the product (total height dimension) is reduced by the inclusion of the metering pedestal apertures/metering pedestals, which enables the adjustable or customizable positioning/locating of the minimum hydraulic diameter within the tip flag cavity, and specifically within the tapering portion thereof.

Similar to that described above, the tip flag cavity core 700 includes both radial tapering and circumferential tapering or narrowing as a cavity core is directed or extends toward the trailing edge. That is, the tip flag cavity core 700 narrows in the dimension between pressure and suction sides in a direction extending toward the trailing edge, as will be appreciated by those of skill in the art. The tapering in the circumferential direction may occur in both the upstream portion and the downstream portion, in addition to the tapering portion, as noted above.

In accordance with some embodiments, the thicknesses, heights, and/or area may be selected based on desired metering. In some such embodiments, a relationship of the radial heights may be employed. For example, in some embodiments, the first radial height $H_1$ may have a relationship to the second radial height $H_2$ of between 1.25:1 to 4:1. In some embodiments, the relationship $H_1:H_2$ may be between 1.5:1 and 2.5:1. Various other relationships may be employed without departing from the scope of the present disclosure, and such relationships are provided for example purposes only. Further still, a relationship of the cross-sectional area of the cavity (or core) of the tapering portion may be employed. For example, a ratio of the first area $A_1$ to the second area $A_2$ may be between 1.25:1 to 4:1. In some embodiments, the relationship $A_1:A_2$ may be between 2:1 and 3:1. In some such embodiments, the metering area $A_m$ may be less than $A_1$ or $A_2$ (i.e., $A_m<A_1$ or $A_2$). Other relationships may be employed without departing from the scope of the present disclosure. Additionally, or in combination, in some non-limiting example embodiments the metering pedestal apertures (or pedestals) may be positioned at an axial location $L_a$ within the tapering portion. In such embodiments, the axial location $L_a$ may be a position relative to the upstream end of the tapering portion (e.g., shown as distance $L_a$ in FIGS. 7A-7B). Stated another way, the axial location $L_a$ is based on a point of transition from the upstream portion to the tapering portion, with the axial location $L_a$ within the tapering portion (i.e., not a distance extending into the downstream portion).

In some non-limiting embodiments, the metering pedestal apertures 706 located in the tapering region 702 may create pedestals to form a minimum local hydraulic area at the metering area $A_m$. The metering area $A_m$ that defines the minimum local hydraulic area is an area that is greater than the downstream second area $A_2$ but less than the upstream first area $A_1$. In this configuration, the formed pedestal(s) provide an intended heat transfer benefit and incur a pressure drop that reduces exit flow less than prior configurations. As such, flow rate is reduced by the presence of the metering pedestals but is a second order influence on flow rate relative to the exit area $A_2$.

Figure 8:
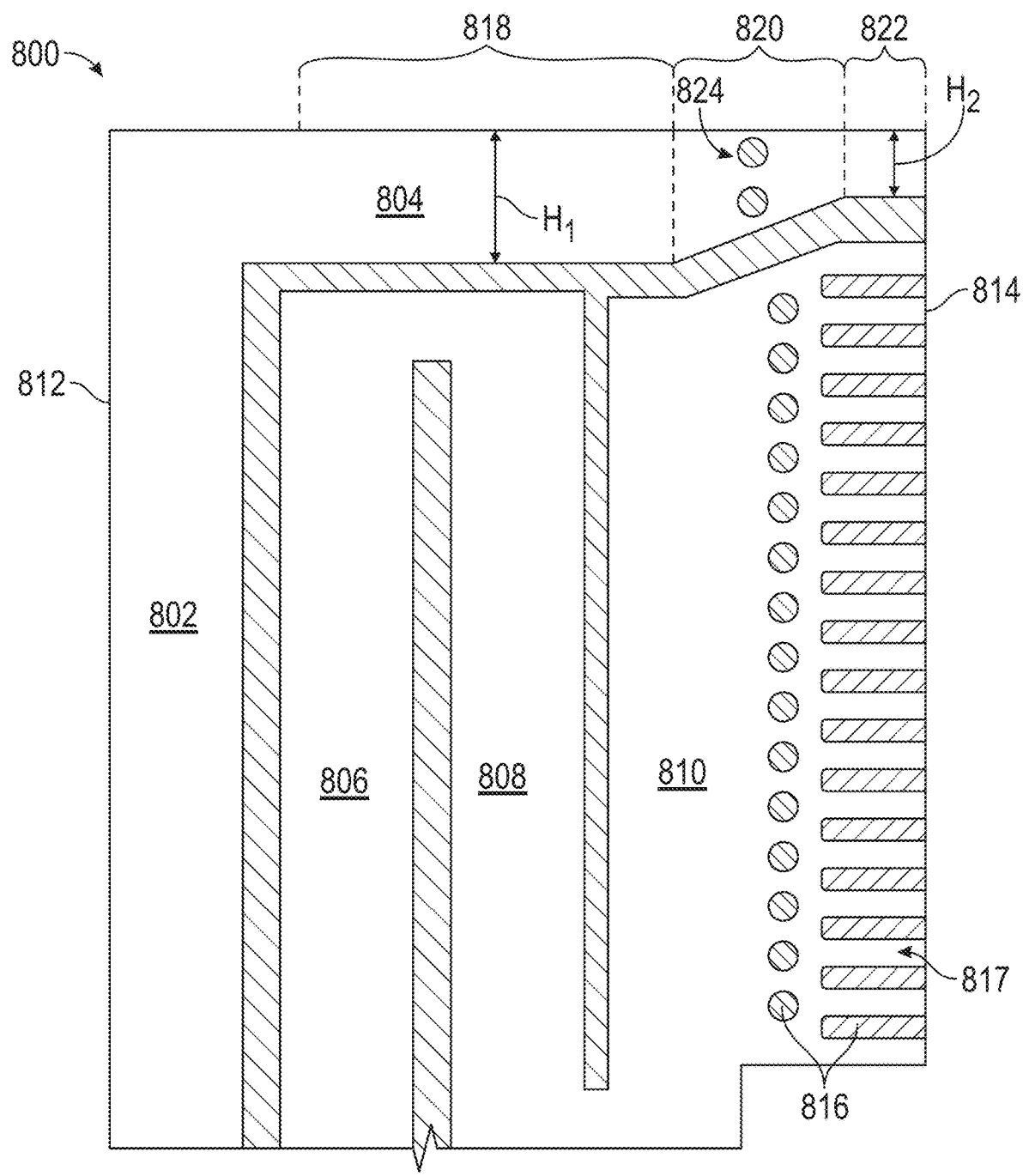
FIG. 8 is schematic illustration of an airfoil cooling cavity configuration in accordance with an embodiment of the present disclosure.

Turning now to FIG. 8, a schematic illustration of an airfoil 800 in accordance with an embodiment of the present disclosure is shown. The airfoil 800 can be formed form a core assembly similar to that shown FIG. 6, or variations thereof, with the features as described herein, and potentially including other additional features, without departing from the scope of the present disclosure. It will be appreciated that, in some embodiments, the airfoil may be formed through other manufacturing processes, yet having the features shown and described herein. For example, in some embodiments, the airfoil illustrated in FIG. 8 may be manufactured using additive manufacturing techniques or other means that do not employ or use a core or core assembly.

The airfoil 800 includes a leading edge cavity 802, a tip flag cavity 804, serpentine cavities 806, 808, and a trailing edge cavity 810. As shown, the leading edge cavity 802 and the tip flag cavity 804 form a single cavity flow path with the leading edge cavity 802 fluidly connected to or flowing into the tip flag cavity 804 in the airfoil 800. The leading edge cavity 802 is arranged along a leading edge 812 of the airfoil 800 and the tip flag cavity 804 extends to a trailing edge 814 of the airfoil 800. As such, cooling air can enter the leading edge cavity 802, flow radially therethrough, flow into the tip flag cavity 804, and exit the airfoil 800 at the trailing edge 814 through an exit formed or defined by an end of the tip flag cavity 804.

The serpentine cavity 806, 808 and the trailing edge cavity 810 are arranged relative to the leading edge cavity 802 and the tip flag cavity 804 within the airfoil 800. As shown, the trailing edge cavity core 810 includes one or more heat transfer augmentation features and/or metering elements 816, which may form or define, in part, trailing edge slots 817.

The tip flag cavity 804 includes a metered section at a location upstream of the exit at the trailing edge 814. To accomplish this, the tip flag cavity 804 includes an upstream portion 818 with a first radial height $H_1$, a tapering portion 820 that has a narrowing radial height, and a downstream portion 822 having a second radial height $H_2$, with the tapering portion 820 changing in height from the first radial height $H_1$ at an upstream end to the second radial height $H_2$ at a downstream end of the tapering portion 820.

Positioned or located within the tapering portion 820 are one or more metering pedestals 824. The metering pedestals 824 are arranged to define a location of a cooling circuit meter (i.e., location of minimum hydraulic area for which the cooling flow passes through the tip flag cavity 804). The position of the metering pedestals 824 is such that they are located in a relatively thicker portion (in a circumference direction, i.e., pressure side to suction side thickness) of the tip flag cavity 804. As such, the metering pedestals 824 are located in a region of thicker airfoil, which can thus ensure the structural integrity of the airfoil 800. The position of the metering pedestals 824 is such that a location of the cooling circuit meter of the formed tip flag cavity 804 is arranged upstream of an exit and within the tapering portion 820.

Advantageously, embodiments provided herein can enable improved producibility of airfoil cores and/or airfoils for gas turbine engines. Advantageously, relatively small or low radial height exits may be implemented for an airfoil, without compromising the producibility and/or structural integrity at the trailing edge. This may be achieved by positioning metering pedestals (and apertures for the formation thereof) upstream of a downstream portion of a tip flag cavity, and within a tapering portion of the tip flag cavity. In addition to provided improved producibility, the positioning of such metering pedestals allows for defining the location of a meter section of the tip flag cavity at a location proximate the trailing edge, but without requiring trailing edge slots, if required or desired.

As used herein, the term "about" is intended to include the degree of error associated with measurement of the particular quantity based upon the equipment available at the time of filing the application. For example, "about" may include a range of ±8%, or 5%, or 2% of a given value or other percentage change as will be appreciated by those of skill in the art for the particular measurement and/or dimensions referred to herein.

The terminology used herein is for the purpose of describing particular embodiments only and is not intended to be limiting of the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof. It should be appreciated that relative positional terms such as "forward," "aft," "upper," "lower," "above," "below," "radial," "axial," "circumferential," and the like are with reference to normal operational attitude and should not be considered otherwise limiting.

While the present disclosure has been described with reference to an illustrative embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A core assembly for manufacturing an airfoil for a gas turbine engine, the core assembly comprising:
a tip flag cavity core having an upstream portion, a tapering portion, and a downstream portion, with the tapering portion located between the upstream portion and the downstream portion and the downstream portion defines an exit in a formed airfoil, wherein:
the upstream portion has a first radial height $H_1$,
the downstream portion has a second radial height $H_2$ that is less than the first radial height $H_1$,
the tapering portion transitions from the first radial height $H_1$ at an upstream end to the second radial height $H_2$ at a downstream end, and
at least one metering pedestal aperture is located within the tapering portion,
wherein the tapering portion has a first circumferential thickness $T_1$ and the downstream portion has a second circumferential thickness $T_2$, wherein the first circumferential thickness $T_1$ is greater than the second circumferential thickness $T_2$.

2. The core assembly of claim 1, further comprising:
a leading edge cavity core arranged in connection with the tip flag cavity core, wherein the leading edge cavity core is configured to form a leading edge cavity that is fluidly connected to a tip flag cavity formed by the tip flag cavity core.

3. The core assembly of claim 1, further comprising one or more cavity cores configured to form a serpentine cavity in the formed airfoil.

4. The core assembly of claim 1, further comprising a trailing edge cavity core configured to form a trailing edge cavity in the formed airfoil.

5. The core assembly of claim 1, wherein the first circumferential thickness $T_1$ has a relationship to the second circumferential thickness $T_2$ of between 1.25:1 to 4:1.

6. The core assembly of claim 1, wherein the at least one metering pedestal aperture is positioned at an axial location $L_a$ within the tapering portion, with the axial location $L_a$ based on a point of transition from the upstream portion to the tapering portion.

7. The core assembly of claim 1, wherein the at least one metering pedestal aperture is two metering pedestal apertures.

8. The core assembly of claim 1, further comprising at least one structure to form a cooling feature fluidically connected to a formed gas path located within the downstream portion.

9. The core assembly of claim 1, wherein the first radial height $H_1$ has a relationship to the second radial height $H_2$ of between 1.25:1 to 4:1.

10. An airfoil for a gas turbine engine, the airfoil comprising:
a tip flag cavity arranged proximate a tip of an airfoil body, the tip flag cavity having an upstream portion, a tapering portion, and a downstream portion, with the tapering portion located between the upstream portion and the downstream portion and the downstream portion defines an exit in the airfoil body, wherein:

the upstream portion has a first radial height $H_1$, the downstream portion has a second radial height $H_2$ that is less than the first radial height $H_1$, the tapering portion transitions from the first radial height $H_1$ at an upstream end to the second radial height $H_2$ at a downstream end, and at least one metering pedestal is located within the tapering portion, wherein the tapering portion has a first circumferential thickness $T_1$ and the downstream portion has a second circumferential thickness $T_2$, wherein the first circumferential thickness $T_1$ is greater than the second circumferential thickness $T_2$.

11. The airfoil of claim 10, further comprising a leading edge cavity arranged in fluid connection with the tip flag cavity.

12. The airfoil of claim 10, further comprising a serpentine cavity.

13. The airfoil of claim 10, further comprising a trailing edge cavity.

14. The airfoil of claim 10, wherein the first circumferential thickness $T_1$ has a relationship to the second circumferential thickness $T_2$ of between 1.25:1 to 4:1.

15. The airfoil of claim 10, wherein the at least one metering pedestal is positioned at an axial location $L_a$ within the tapering portion, with the axial location $L_a$ based on a point of transition from the upstream portion to the tapering portion.

16. The airfoil of claim 10, wherein the at least one metering pedestal is two metering pedestals.

17. The airfoil of claim 10, further comprising at least one cooling feature fluidically connected to the gas path located within the downstream portion.

18. The airfoil of claim 10, wherein the first radial height $H_1$ has a relationship to the second radial height $H_2$ of between 1.25:1 to 4:1.

* * * * *